United States Patent
Kuo et al.

(10) Patent No.: US 6,504,827 B1
(45) Date of Patent: Jan. 7, 2003

(54) DISCONTINUOUS TRANSMISSION ON HIGH SPEED DATA CHANNELS

(75) Inventors: Wen-Yi Kuo, Parsippany, NJ (US); Martin Howard Meyers, Montclair, NJ (US); Xiao Cheng Wu, Parsippany, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/215,437

(22) Filed: Dec. 18, 1998

(51) Int. Cl.$^7$ ................................. H04Q 7/00
(52) U.S. Cl. .................... 370/329; 370/345; 370/468
(58) Field of Search ........................ 370/465, 468, 370/522, 335, 342, 329, 345, 476, 232, 441

(56) References Cited

U.S. PATENT DOCUMENTS

| | | | | |
|---|---|---|---|---|
| 5,166,929 A | * | 11/1992 | Lo .............................. | 370/232 |
| 5,420,864 A | * | 5/1995 | Dahlin et al. ................ | 370/347 |
| 5,504,773 A | * | 4/1996 | Padovani et al. ........... | 370/441 |
| 5,673,259 A | * | 9/1997 | Quick, Jr. .................... | 370/342 |
| 5,729,541 A | * | 3/1998 | Hamalainen et al. ....... | 370/322 |
| 5,742,592 A | * | 4/1998 | Scholefield et al. ........ | 370/329 |
| 5,790,551 A | * | 8/1998 | Chan ........................... | 370/458 |
| 5,828,662 A | * | 10/1998 | Jalali et al. ................. | 370/335 |
| 5,859,840 A | * | 1/1999 | Tiedemann, Jr. et al. ... | 370/335 |
| 5,910,949 A | * | 6/1999 | Bilstrom et al. ............ | 370/337 |
| 5,926,469 A | * | 7/1999 | Norstedt et al. ............ | 370/465 |
| 5,926,500 A | * | 7/1999 | Odenwalder ................ | 370/342 |
| 5,943,316 A | * | 8/1999 | Davis ......................... | 370/232 |
| 6,094,429 A | * | 7/2000 | Blanchette et al. ......... | 370/322 |

FOREIGN PATENT DOCUMENTS

CA      2214943      3/1998

* cited by examiner

Primary Examiner—Steven Nguyen
Assistant Examiner—Phuongchau Ba Nguyen
(74) Attorney, Agent, or Firm—Jimmy Goo; Harness, Dickey & Pierce, P.L.C.

(57) ABSTRACT

The present invention is a method for efficiently utilizing spectrum resources belonging to a wireless communications system in the presence of data channels through a discontinuous data transmission technique. The discontinuous data transmission technique involves the transmission of a flag over a control channel (or some other communication channel) in frame f, wherein the flag would indicate to an intended recipient that a transmitter has a data frame to transmit to the recipient in some future frame f+q. In an embodiment, the transmitter would subsequently transmit the data frame over a data channel (or some other communication channel) in frame f+q if the flag indicated that the data frame was ready to be transmitted. In another embodiment, the transmitter would not transmit the data frame unless the recipient has indicated (via another flag) that the recipient is ready to receive the frame of data from the transmitter.

7 Claims, 6 Drawing Sheets

400

FORWARD LINK DATA DISCONTINUOUS TX
FTF = FORWARD TRANSMIT FLAG

500

*600*

RRF= REVERSE RECEIVE FLAG

DISCONTINUOUS TRANSMISSION ON HIGH SPEED DATA CHANNELS

FIELD OF THE INVENTION

The present invention relates generally to wireless communication systems and, in particular, to data transmissions over wireless communications systems.

BACKGROUND OF THE RELATED ART

The Internet boom has sparked the need for transmitting data at high speeds. This need for high speed data transmission has been met by service providers of wireline communications systems, but not by service providers of wireless communications systems. Currently, there are proposals for developing a wireless communications system based on Code Division Multiple Access (CDMA) technology having communication channels over which data may be transmitted at high speeds (hereinafter referred to as data or supplemental channels). However, dedicating spectrum resources to data channels would be inefficient due to the bursty nature of data transmission. In other words, data is transmitted in bursts followed by periods of inactivity where no data is transmitted. To have spectrum resources dedicated to data channels during these periods of inactivity would be inefficient utilization of spectrum resources. Accordingly, there exists a need for a wireless communications system that utilizes spectrum resources more efficiently in the presence of data channels.

SUMMARY OF THE INVENTION

The present invention is a method for efficiently utilizing spectrum resources belonging to a wireless communications system having data channels for high speed data services. The present invention employs a discontinuous data transmission technique to more efficiently utilize spectrum resources. The discontinuous data transmission technique involves the transmission of a flag over a control channel (or some other communication channel) in frame f, wherein the flag would indicate to an intended recipient that a transmitter has a data frame to transmit to the recipient in some future frame f+q. In an embodiment, the transmitter would subsequently transmit the data frame over a data channel (or some other communication channel) in frame f+q if the flag indicated that the data frame was ready to be transmitted. In another embodiment, the transmitter would not transmit the data frame unless the recipient has indicated (via another flag transmitted over a control channel in an opposite direction) that the recipient is ready to receive the frame of data from the transmitter.

Advantageously, the present invention prevents overhead of setting up data channels by having the data channels already set up and waiting for data frames to arrive. Between active data transmissions, frequency spectrum resources used by the transmitter may be shared with other users to more efficiently utilize the frequency spectrum.

BRIEF DESCRIPTION OF THE DRAWINGS

The features, aspects, and advantages of the present invention will become better understood with regard to the following description, appended claims, and accompanying drawings where:

DETAILED DESCRIPTION

The present invention will be described herein with reference to wireless communications systems based on Code Division Multiple Access (CDMA) technology. It should not be construed, however, to limit the present invention to the CDMA based wireless communications systems described herein. The present invention can be equally applicable to wireless communications systems based on other multiple access technologies, such as Time Division Multiple Access (TDMA) and Frequency Division Multiple Access (FDMA).

Figure 1:
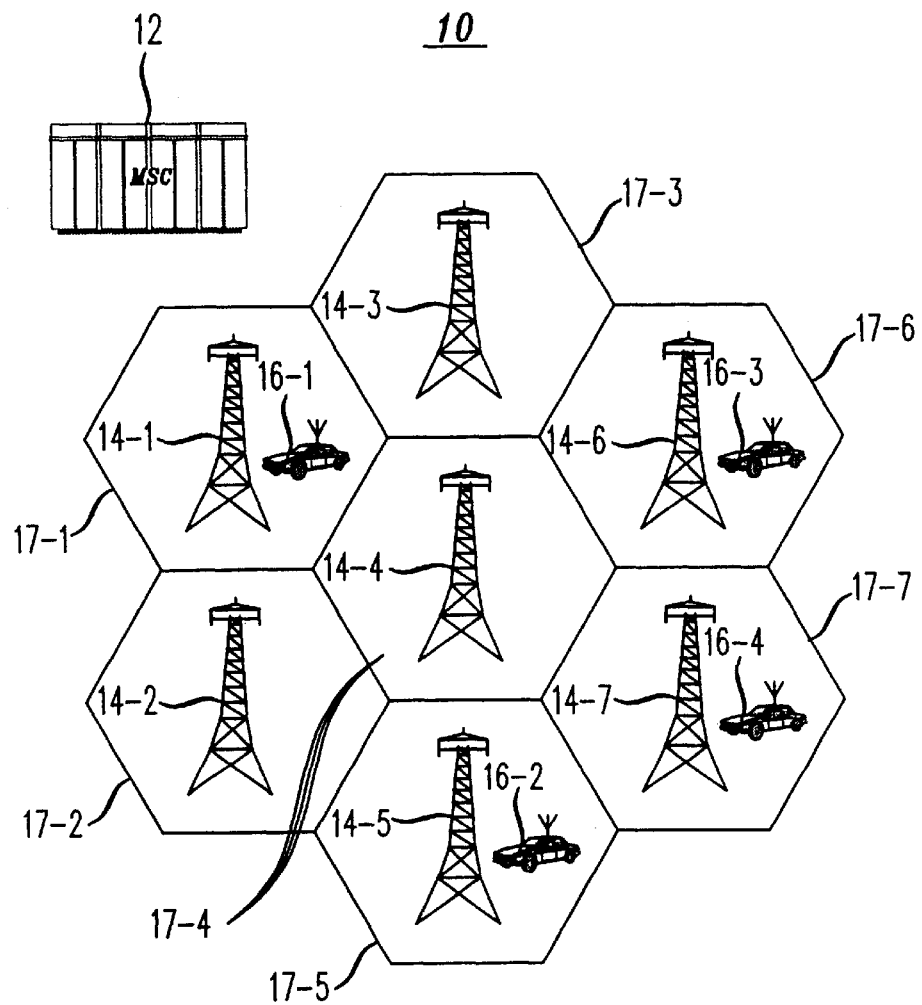
FIG. 1 depicts a CDMA based wireless communications system used in accordance with the present invention.

FIG. 1 depicts a CDMA based wireless communications systems 10 used in accordance with the present invention. The wireless communications system 10 comprises mobile switching center (MSC) 12 and base stations (BS) 14-$i$ for providing wireless communication services to mobile-telephones (MT) 16-$k$ within its associated cells 17-$i$. Each of the base stations 14-$i$ is connected to MSC 12 by connections, such as T-1 lines, not shown, and is operable to communicate with MT 16-$k$ over a prescribed frequency spectrum. Communication is achieved between BS 14-$i$ and MT 16-$k$ by the transmission of signals (from and to the base stations) over a variety of communication channels in the prescribed frequency spectrum, wherein communication channels for the transmission of signals from BS 14-$i$ to MT 16-$k$ are referred to herein as a forward link and communication channels for the transmission of signals from MT 16-$k$ to BS 14-$i$ are referred to herein as a reverse link. The forward link using a first portion of the prescribed frequency spectrum and the reverse link using a second portion of the prescribed frequency spectrum.

Figure 2:
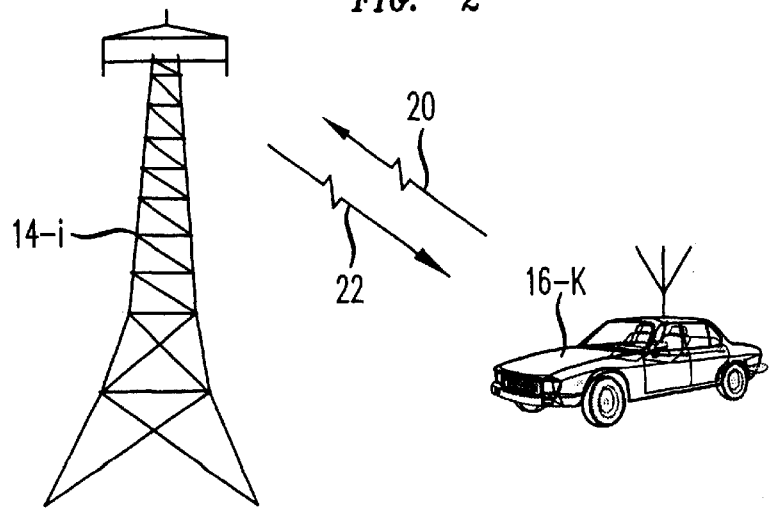
FIG. 2 depicts a base station communicating with a mobile-telephone via a forward link and a reverse link.

FIG. 2 depicts base station 14-$i$ communicating with mobile-telephone 16-$k$ via forward link 20 and reverse link 22. Forward link 20 comprises forward dedicated control channels (F-DCCH) for transmitting control information, forward fundamental channels (F-FCH) for transmitting voice, forward supplemental channels (F-SCH) for transmitting data, and forward pilot channels (F-PC) for transmitting pilot information. Reverse link 22 comprises a reverse dedicated control channel (R-DCCH) for transmitting control information, a reverse fundamental channel (R-FCH) for transmitting voice, a reverse supplemental channel (R-SCH) for transmitting data, and a reverse pilot channel (R-PC) for transmitting pilot information. The forward and reverse link pilot channel signals being used for coherent demodulation of the respective forward and reverse link dedicated control, fundamental and supplemental channel signals. The manner in which the communication channels of forward link 20 and reverse link 22 are defined depends on the specific implementation of the wireless communication system. One particular embodiment will be described herein, but should not be construed to limiting the present invention in any manner.

Figure 3:
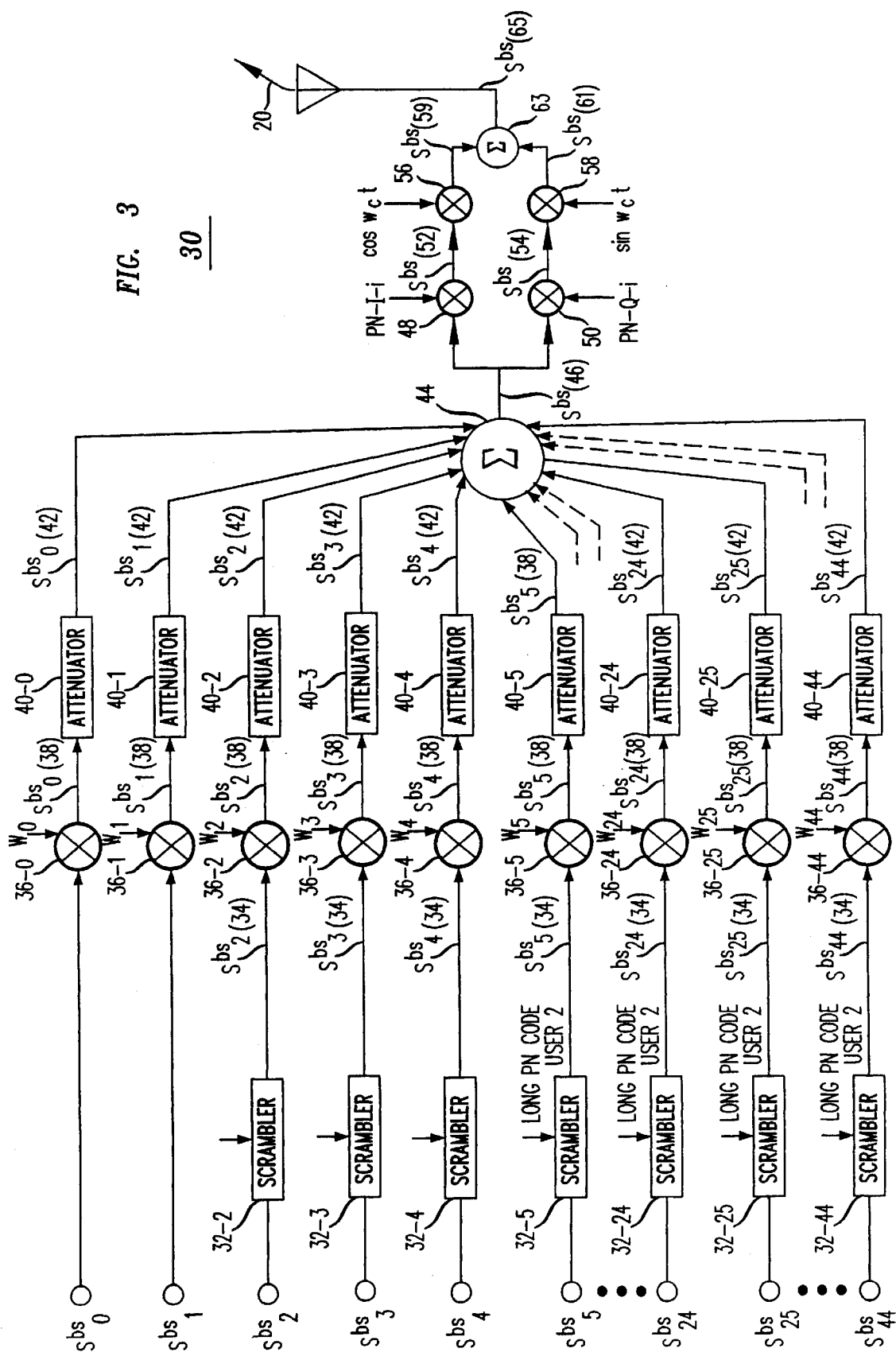
FIG. 3 depicts a simplified schematic diagram for an implementation of a CDMA based BS transmitter.

To illustrate signal processing for forward link 20, a simplified schematic diagram for an implementation of a CDMA based BS transmitter 30 for base station 14-$i$ is shown in FIG. 3. BS transmitter 30 receives a plurality of input signals $S^{bs}_m$, where m=0, . . . ,44. For purposes of illustration, signal $S^{bs}_0$ is pilot information (which, in one embodiment, is a known signal generated by BS transmitter 30), signal $S^{bs}_1$ is synchronization information, signals $S^{bs}_2$–$S^{bs}_3$ are paging information, signal $S^{bs}_4$ is common control information, signals $S^{bs}_5$–$S^{bs}_{24}$ are voice, and signals $S^{bs}_{25}$–$S^{bs}_{44}$ are data signals $S^{bs}_2$–$S^{bs}_{44}$ (or signals $S^{bs}_p$) are provided as inputs to scrambler 32-$p$, where p=2, . . . ,45. In scrambler 32-$p$, signals $S^{bs}_2$–$S^{bs}_4$ are modulated with a decimated common long code, and signals $S^{bs}_5$–$S^{bs}_{44}$ are modulated with the decimated long pseudo-random number (PN) codes z to produce output signals $S^{bs}_p(34)$, wherein the long PN codes z are secret or privacy codes associated with users z to which signals $S^{bs}_5$–$S^{bs}_{44}$ are intended. Note that more than one $S^{bs}_p(34)$ may be intended for a same user z. Signals $S^{bs}_0$–$S^{bs}_1$ and $S^{bs}_p(34)$ are multiplied with Walsh codes $W_m$ (in multiplier 36-$m$ to produce output signals $S^{bs}_m(38)$, wherein Walsh codes $W_m$ are orthogonal functions used to define distinct communication channels at BS 14-$i$. Thus, at BS 14-$i$, the forward pilot channel is defined using Walsh code $W_0$, the synchronization channel is defined using Walsh code $W_1$, the paging channels are defined using Walsh codes $W_2$–$W_4$, the forward common control channel is defined using Walsh code $W_4$, the forward fundamental channels are defined using Walsh codes $W_5$–$W_{24}$, and the forward supplemental channels are defined using Walsh codes $W_{25}$–$W_{44}$. Note that the Walsh codes may vary with respect to its chip per bit rate (e.g., Walsh code $W_{25}$ may have a higher chip per bit rate than Walsh code $W_5$) and each forward supplemental channel may vary with respect to its bit per second rate (e.g., 57.6 kbps, 115.2 kbps, 460 kbps, etc.).

Signals $S^{bs}_m(38)$ are attenuated by variable attenuator 40-$m$ to produce output signals $S^{bs}_m(42)$. The amount each individual signal $S^{bs}_m(38)$ is attenuated varies according to a number of system parameters, such as radio frequency (RF) conditions, power control, etc. Signals $S^{bs}_m(42)$ are summed together by summer 44 to produce output signal $S^{bs}(46)$, which is then provided as inputs to multipliers 48 and 50. In multipliers 48 and 50, signal $S^{bs}(46)$ is multiplied with a pair of short PN codes (which are different from the long PN codes) to produce signals $S^{bs}(52)$ and $S^{bs}(54)$. Specifically, output signal $S^{bs}(46)$ is multiplied by PN-I-i and PN-Q-i, wherein PN-I-i and PN-Q-i are in-phase (I) and quadrature (Q) PN codes having a timing or phase offset index associated with BS 14-$i$. Signals $S^{bs}(52)$ and $S^{bs}(54)$ are subsequently modulated onto carrier signals $\cos \omega_c t$ and $\sin \omega_c t$, summed and transmitted as forward link 20. Thus, FIG. 3 depicts a forward link 20 that includes a forward pilot channel, a synchronization channel, two paging channels, a forward common control channel, twenty forward fundamental channels, and twenty forward supplemental channels. Note that this should not, however, be construed to limit the forward link or the present invention in any manner.

Input signals $S^{bs}_m$ are processed and transmitted by BS transmitter 30 over a series of frames (or time intervals) of 20 ms in duration. For purposes of this application, the term "process" should be construed to include encode and/or modulate when used in the context of transmitting and to include demodulate and/or decode when used in the context of receiving, and the term "frames" should not be limited to time intervals of 20 ms. The present invention uses a discontinuous transmission technique in forward link 20 to account for the bursty nature of data transmission resulting in a more efficient utilization of spectrum resources.

Specifically, the present invention uses a forward dedicated control channel (or another forward communication channel) to transmit forward transmit flags (or indicate bit) in frame f which will indicate to one or more MT 16-$k$ to process forward data transmission received over MT 16-$k$'s assigned forward supplemental channel (or other forward communication channel) in frame f+q, where in f represents the current frame, f+q represents some future frame, and q may be either a constant value or a variable.

Figure 4:
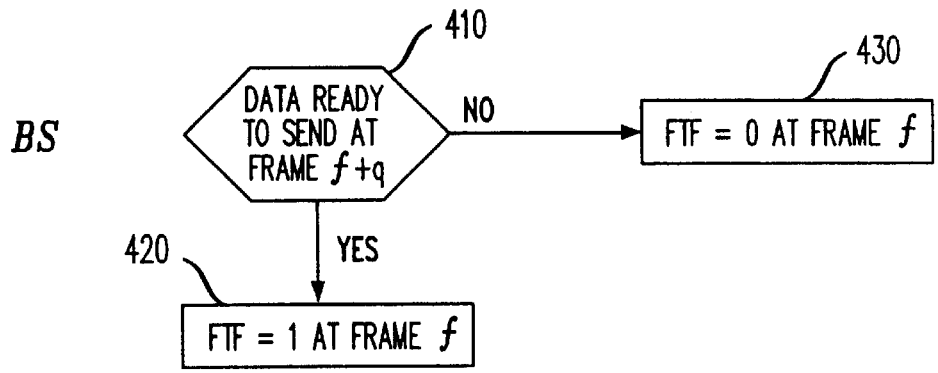
FIGS. 4 and 5 depict flowcharts illustrating a discontinuous transmission technique for forward links in accordance with the present invention.
Figure 5:
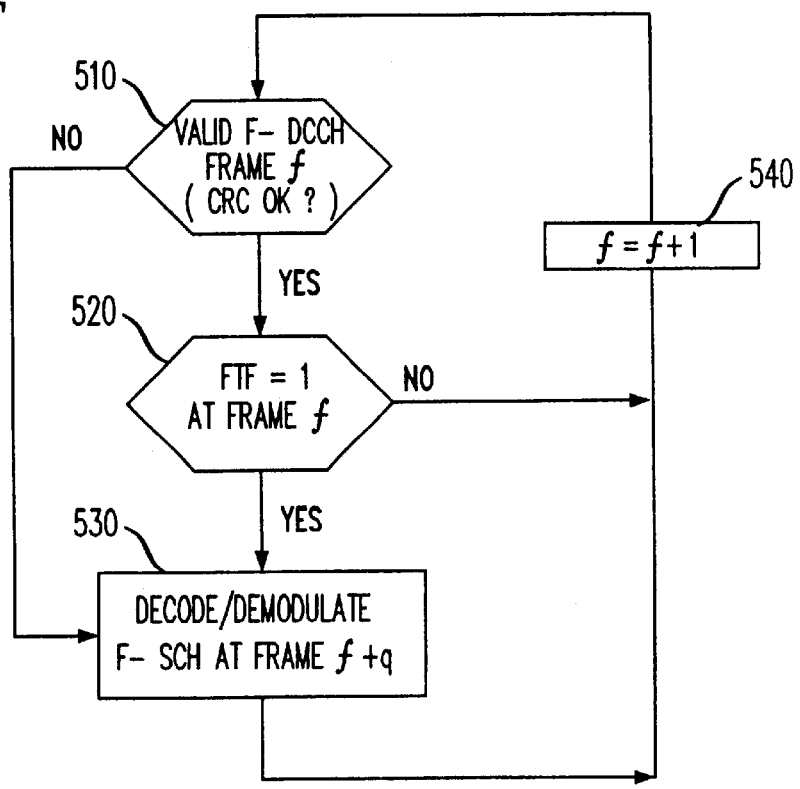

FIGS. 4 and 5 depict flowcharts 400 and 500 illustrating the present invention discontinuous transmission technique for forward links being employed by BS 14-$i$ and MT-$k$, respectively. As shown in FIG. 4, (for BS 14-$i$), in step 410, BS 14-$i$ (or a base station controller) determines whether to transmit data to MT 16-$k$ at frame f+q over MT 16-$k$'s assigned F-SCH. If BS 14-$i$ is ready to transmit data, a positive forward transmit flag (having a value of 1) is transmitted at frame f, in step 420, wherein a positive forward transmit flag will indicate to mobile-telephone 16-$k$ that data will (or is ready to) be transmitted in frame f+q over MT 16-$k$'s assigned F-SCH. Otherwise, in step 430, BS 14-$i$ transmits a negative forward transmit flag (having a value of 0) at frame f, wherein a negative forward transmit flag will indicate to the mobile-telephone 16-$k$ that no data will be transmitted in frame f+q over MT 16-$k$'s assigned F-SCH.

By contrast, as shown in FIG. 5 (for MT 16-$k$) in step 510, MT 16-$k$ checks frame f of the F-DCCH to determine whether the received frame f is valid (i.e., no error in the transmission of frame f of the F-DCCH). If frame f is invalid, MT 16-$k$ will attempt to process frame f+q of its F-SCH, in step 530 (in order to reduce the amount of re-transmissions of the same data by BS 14-$i$). If frame f of the F-DCCH is valid, in step 520, MT 16-$k$ will check the forward transmit flag transmitted in frame f If the forward transmit flag is positive, MT 16-$k$ proceeds to step 530 where it processes frame f+q of MT 16-$k$'s R-SCH. If the forward transmit flag is negative MT 16-$k$ will not process frame f+q of MT 16-$k$'s R-SCH.

Note that BS 14-$i$ and MT 16-$k$ uses a protocol which would allow MT 16-$k$ to distinguish the forward transmit flag from other bits transmitted over the F-DCCH (or other forward communication channel). In one embodiment, the forward transmit flag is a bit in a known position relative to a frame boundary or to a mobile-telephone or forward supplemental channel identifier such that the forward transmit flag is readily identifiable, wherein the mobile-telephone and forward supplemental channel identifier (which may be transmitted over the same or a different communication channel) indicate the MT 16-$k$ or forward supplemental channel to which the forward transmit flag is intended or over which the data will be transmitted.

The decision when to transmit data to MT 16-$k$(or whether to transmit a positive or a negative forward transmit flag) is, in one embodiment, determined by BS 14-$i$, a base station controller, or some other entity or device that manages (or has knowledge of) the available spectrum resources. In this embodiment, BS 14-$i$(or base station controller) examines the available spectrum resources for the forward link and RF conditions of its associated cells before determining in which frames data should be transmitted to MT 16-$k$. For example, suppose there are two mobile-telephones $MT_1$ and $MT_2$ to which forward fundamental channels are assigned (i.e., two data users). Good RF conditions exist between BS 14-$i$ and $MT_1$, but bad RF conditions exist between BS 14-$i$ and $MT_2$. Because $MT_1$ has associated good RF conditions, signals intended for $MT_1$ would require less attenuation (by attenuator 40-$m$) than signals intended for $MT_2$. Less attenuation would result in a smaller consumption of spectrum resources by $MT_1$ than by $MT_2$. Since $MT_1$ consumes less spectrum resources than $MT_2$, BS 14-$i$ (or base station controller) can transmit data frames more frequently to $MT_1$ than to $MT_2$. In an alternate embodiment, a schedule or randomness may be used to specify which forward transmit flag is being transmitted by BS 14-$i$ to MT 16-$k$.

Figure 6:
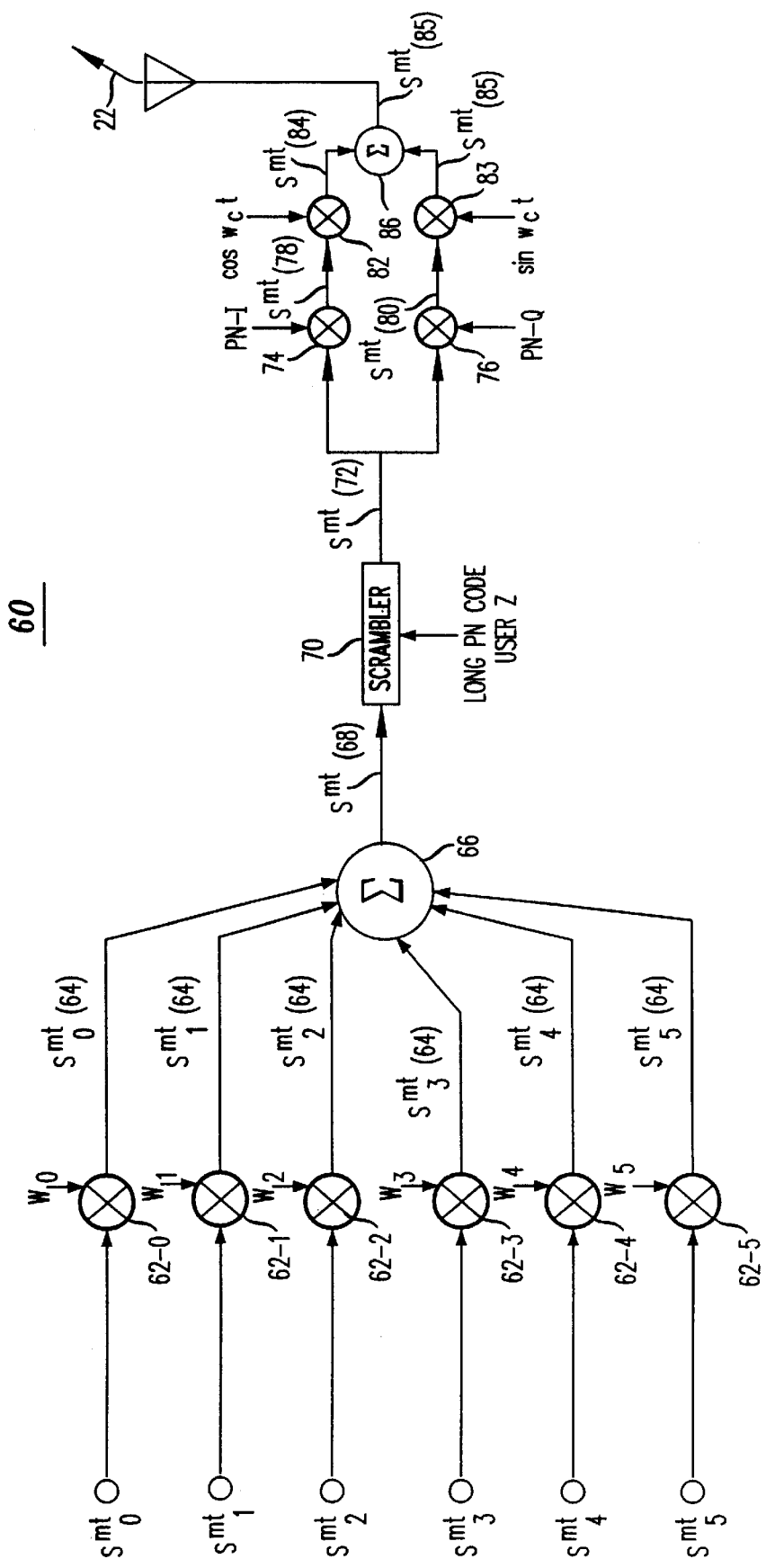
FIG. 6 depicts a simplified schematic diagram for an implementation of a CDMA based MT transmitter 60.

To illustrate signal processing for reverse link 22, a simplified schematic diagram for an implementation of a CDMA based MT transmitter 60 for mobile-telephone 16-$k$ is shown in FIG. 6. MT transmitter 60 receives a plurality of input signals $S^{mt}_x$, where x=0, . . . ,5. For purposes of illustration, signal $S^{mt}_0$, is pilot information, signals $S^{mt}_1$-$S^{mt}_2$ are access messages, signal $S^{mt}_3$ is common control information, signals $S^{mt}_4$ is voice, and signal $S^{mt}_5$ is data. Signals $S^{mt}_x$ are provided as inputs to multipliers 62-$x$ where signals $S^{mt}_x$ are multiplied with Walsh codes $W_{0-W5}$, respectively, to produce output signals $S^{mt}_x(64)$. Signals $S^{mt}_x(64)$ are summed together by summer 66 to produce signal $S^{mt}(68)$. Scrambler 70 multiplies signal $S^{mt}(68)$ with the long PN code (associated with user z of mobile-telephone 16-$k$) to produce output signal $S^{mt}(72)$. Signal $S^{mt}(72)$ is multiplied by multipliers 74 and 76 using the same pair of short PN codes (used by BS-$i$ but with a zero timing or phase offset index) to produce in-phase signal $S^{mt}(78)$ and quadrature signal $S^{mt}(80)$, which are then modulated onto carrier signals cos $\omega_c$t and sin $\omega_c$t, summed and transmitted as reverse link 22. Thus, FIG. 5 depicts a reverse link 22 that includes a reverse pilot channel, two random access channels, a reverse common control channel, a reverse fundamental channel, and a reverse supplemental channel. Note that this should not, however, be construed to limit the reverse link or the present invention in any manner.

Input signals $S^{mt}_m$ are processed and transmitted by MT transmitter 60 over a series of frames (or time intervals) of 20 ms in duration. Like forward link 20, the present invention uses a discontinuous transmission technique in reverse link 22 to account for the bursty nature of data transmission resulting in a more efficient utilization of spectrum resources. The present invention uses a forward dedicated control channel (or another forward communication channel) to transmit reverse receive flags (or indicator bits) in frame f which will indicate to one or more MT 16-$k$ that BS 14-$i$ is ready to receive data over MT 16-$k$'s reverse supplemental channel (or other reverse communication channel) in frame g+r, and a reverse dedicated common control channel (or another reverse communication channel) to transmit reverse transmit flags (or indicator bits) in frame g which will indicate to BS 14-$i$ that MT 16-$k$ has data to transmit over MT 16-$k$'s reverse supplemental channel (or another reverse communciation channel) in frame g+r, wherein g and f may or may not correspond to a same time interval of a same or different communication channel, and r is a constant or variable. The notations g and f should not be construed to refer to a specific direction (i.e., reverse or forward). Note that the relationship between g and f should be known to the base station and the mobile-telephone. For example, f=g−γ, where Δ is a constant.

Figure 7:
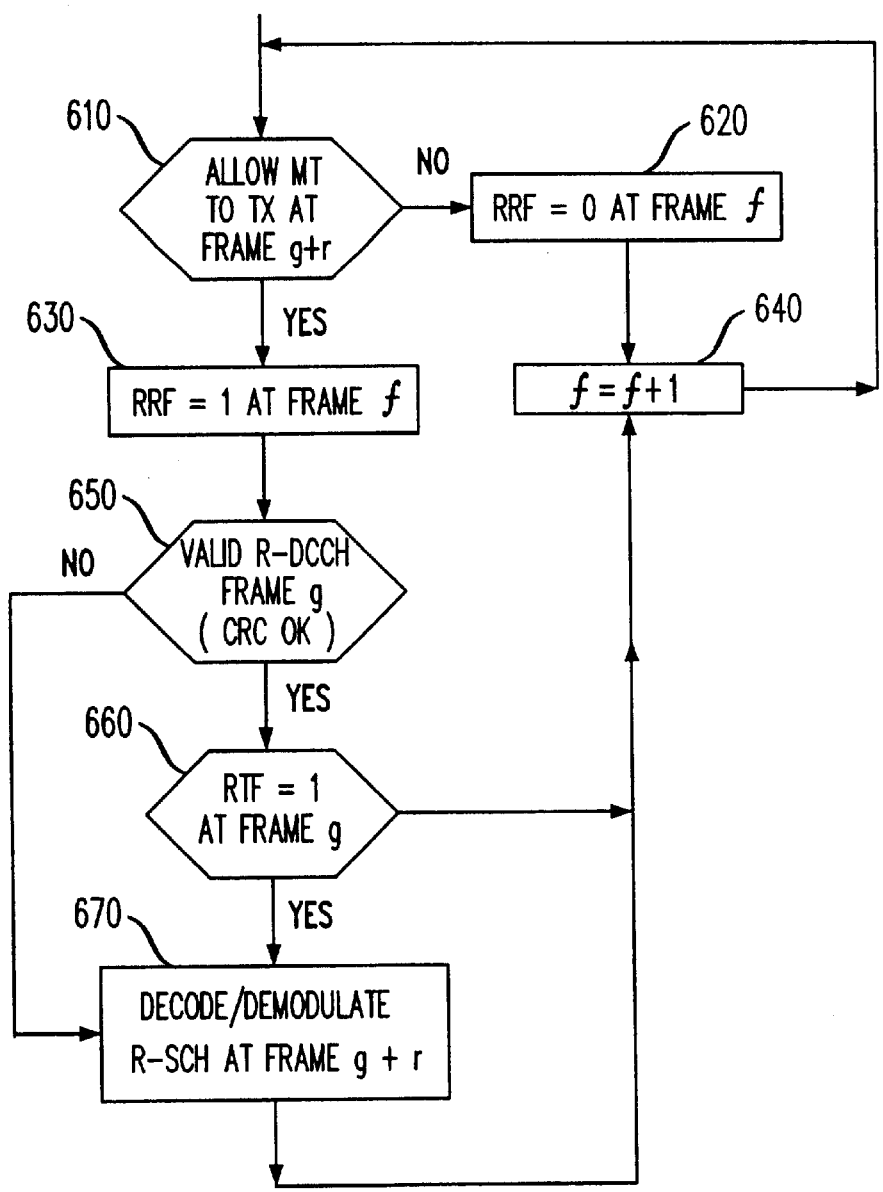
FIGS. 7 and 8 depict flowcharts illustrating a discontinuous transmission technique for reverse links in accordance with the present invention.
Figure 8:
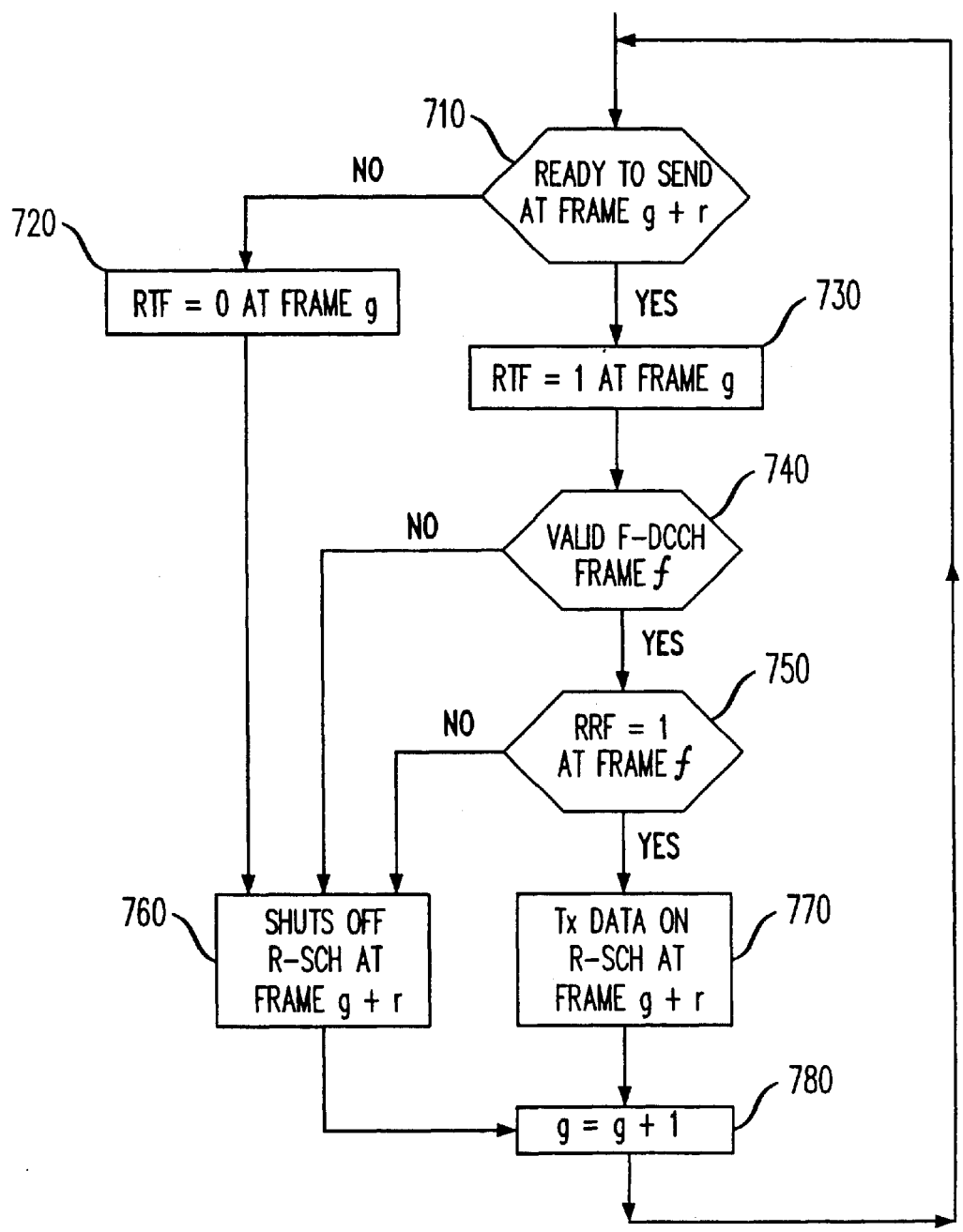

FIGS. 7 and 8 depict flowcharts 600 and 700 illustrating the present invention discontinuous data transmission technique for reverse links being employed by BS 14-$i$ and MT 16-$k$, respectively. As shown in FIG. 7 (for BS 14-$i$), in step 610, BS 14-$i$ (or a base station controller) determines whether to allow MT 16-$k$ to transmit data to BS 14-$i$ at frame g+r over MT 16-$k$'s R-SCH. If BS 14-$i$ is ready to receive data from MT 16-$k$, in step 630, a positive reverse receive flag (having a value 1) is transmitted in frame f over the F-DCCH, wherein the positive reverse receive flag will indicate to mobile-telephone 16-$k$ that BS 14-$i$ will be ready to receive data transmission in frame g+r over MT 16-$k$'s R-SCH. Otherwise, in step 620, BS 14-$i$ transmits a negative reverse receive flag (having a value of 0) in frame f over the F-DCCH, wherein the negative reverse receive flag will indicate to mobile-telephone 16-$k$ that BS 14-$i$ will not be ready to receive data transmission in frame g+r over MT 16-$k$'s R-SCH.

If BS 14-$i$ transmits a positive reverse receive flag, in step 650, BS 14-$i$ checks frame g of MT 16-$k$'s R-DCCH to determine whether the received frame g is valid (i.e., no error in the transmission of frame g of MT 16-$k$'s R-DCCH). If frame g is valid, in step 660, BS 14-$i$ will check to determine whether the reverse transmit flag in frame g is positive or negative, wherein a positive reverse transmit flag (having a value of 1) will indicate to BS 14-$i$ that MT 16-$k$ has data to transmit and is ready to transmit data in frame g+r over MT 16-k's R-SCH, and a reverse transmit flag (having a value of 0) will indicate to BS 14-$i$ that MT 16-$k$ has no data to transmit over MT 16-$k$'s R-SCH.

If frame g is invalid or if BS 14-$i$ receives a positive reverse transmit flag in frame g of MT 16-$k$'s R-DCCH, then BS 14-$i$ will process frame g+r of MT 16-$k$'s R-SCH in step 670. But if BS 14-$i$ receives a negative reverse transmit flag in frame g of MT 16-$k$'s R-DCCH, BS 14-$i$ will not process frame g+r of MT 16-$k$'s R-SCH.

As shown in FIG. 8 (for MT 16-$k$), in step 710, MT 16-$k$ determines if it has data to transmit in frame g+r of its R-SCH to BS 14-$i$. If MT 16-$k$ does not have data to transmit, MT 16-$k$ sends a negative reverse transmit flag in frame g of its R-DCCH, in step 720, and then shuts off (or does no processing for) frame g+r of its R-SCH, in step 760. Otherwise, in step 730, MT 16-$k$ sends a positive reverse transmit flag. Upon sending a positive reverse transmit flag, in step 750, MT 16-$k$ checks frame f of the F-DCCH. If the reverse receive flag is positive (i.e., reverse receive flag is not negative and frame f of F-DCCH is valid), in step 770, MT 16-$k$ transmits data in frame g+r of its R-SCH. Otherwise MT 16-$k$ shuts off its R-SCH in frame g+r.

Like the forward link BS 14-$i$ and MT 16-$k$ will use some type of protocol which would allow BS 14-$i$ and MT 16-$k$ to distinguish the reverse transmit and reverse receive flags from other bits transmitted over the R-DCCH (or other reverse communication channel) and F-DCCH (or other forward communication channel), respectively. In one embodiment, the reverse receive flag is a bit in a known position relative to the frame boundary or to a mobile-telephone identifier such that the reverse receive flag is readily identifiable, and the reverse transmit flag is a bit in a known position relative to the frame boundary.

The decision whether to transmit a positive or a negative reverse receive flag is, in one embodiment, determined by BS 14-$i$ (or a base station controller) or some other entity or device that manages (or has knowledge of) the available spectrum resources. In this embodiment, BS 14-$i$ examines the available spectrum resources for the forward link and RF conditions of its associated cell before determining which reverse receive flag to transmit to MT 16-$k$. Alternately, a schedule or randomness may be used to specify which reverse receive flag is be transmitted by BS 14-$i$ to MT 16-$k$.

In the reverse link, MT 16-$k$ will transmit a positive reverse transmit flag (via the reverse dedicate control channel) if MT 16-$k$ has data to transmit to BS 14-$i$ over MT 16-$k$'s reverse supplemental channel. Conversely, MT 16-$k$ will transmit a negative reverse transmit flag if MT 16-$k$ has no data to transmit to BS 14-*i* over MT 16-*k*'s reverse supplemental channel.

Although the present invention has been described in considerable detail with reference to certain embodiments, other versions are possible. For example, the flags and the data may be transmitted over the same communication channel or different communication channels, or the flags may be transmitted over fundamental channels. Furthermore, the flags may comprise of multiple bits. Therefore, the spirit and scope of the present invention should not be limited to the description of the embodiments contained herein.

We claim:

1. A method of transmitting data frames over a communication channel comprising the steps of:

determining whether a data frame is ready to be transmitted in a frame f+q, the frame f+q being a future frame with respect to a present frame f;

transmitting from a transmitter a transmit flag over a first communication channel in the frame f to indicate whether [a] the data frame is ready to be transmitted in the frame f+q over a second communication channel, a positive transmit flag being transmitted when the determining step determines that a data frame is ready to be transmitted in the frame f+q, and a negative transmit flag being transmitted when the determining step determines that no data will be transmitted in the frame f+q; and in the absence of receiving any communication in response to the transmitted transmit flag, transmitting from the transmitter the data frame in the frame f+q over the second communication channel if the transmit flag is a positive transmit flag indicating that the data frame is ready to be transmitted in the frame f+q.

2. The method of claim 1, wherein the data frame is not transmitted in the frame f+q over the second communication channel if the transmit flag is a negative transmit flag indicating the data frame will not be transmitted in the frame f+q.

3. The method of claim 1 comprising the additional step of:

transmitting a mobile-telephone identifier over a third communication channel to indicate a mobile-telephone to which the transmit flag is intended.

4. The method of claim 1 comprising the additional step of:

transmitting a communication channel identifier over a third communication channel to indicate a communication channel over which the transmit flag is to be transmitted.

5. A method of receiving data frames transmitted over a communication channel comprising the steps of:

receiving at a receiver a transmit flag over a first communication channel in a frame g to indicate whether a data frame is ready to be transmitted in a frame g+r, the frame g+r being a future frame with respect to the frame g, the received transmit flag being positive when a data frame is ready to be transmitted in the frame g+r, and the received transmit flag being negative when no data will be transmitted in the frame g+r;

determining whether the received transmit flag is positive or negative; and in the absence of responding to the received transmit flag, processing at the receiver the data frame transmitted in the frame g+r of a second communication channel if the transmit flag is a positive transmit flag indicating that the data frame is ready to be transmitted in the frame g+r over the second communication channel.

6. The method of claim 5, wherein the frame g+r of the second communication channel is not processed if the transmit flag is a negative transmit flag indicating no data frame will be transmitted in the frame g+r.

7. The method of claim 5 wherein the frame g+r of the second communication channel is processed if an error occurred with respect to the transmit flag in the frame g of the first communication channel.

\* \* \* \* \*